(12) United States Patent
Park

(10) Patent No.: US 10,429,028 B2
(45) Date of Patent: Oct. 1, 2019

(54) SOFT BOX WITH SMOOTH ROD FOLDING STRUCTURE

(71) Applicant: HYUNDAE PHOTONICS CO., LTD., Daegu (KR)

(72) Inventor: Jin Suk Park, Gyeongdangbuk-do (KR)

(73) Assignee: HYUNDAE PHOTONICS CO., LTD., Daegu (KR)

(*) Notice: Subject to any disclaimer, the term of this patent is extended or adjusted under 35 U.S.C. 154(b) by 0 days.

(21) Appl. No.: 16/044,053

(22) Filed: Jul. 24, 2018

(65) Prior Publication Data

US 2019/0049091 A1 Feb. 14, 2019

(30) Foreign Application Priority Data

Aug. 8, 2017 (KR) .................. 10-2017-0100393

(51) Int. Cl.
F21V 1/06 (2006.01)
G03B 15/02 (2006.01)

(52) U.S. Cl.
CPC ................ F21V 1/06 (2013.01); G03B 15/02 (2013.01)

(58) Field of Classification Search
CPC .................................. F21V 1/06; G03B 15/02
See application file for complete search history.

(56) References Cited

U.S. PATENT DOCUMENTS

2006/0007666 A1* 1/2006 Cook ..................... G03B 15/02
362/16

FOREIGN PATENT DOCUMENTS

KR 101127458 3/2012

* cited by examiner

Primary Examiner — David V Bruce
(74) Attorney, Agent, or Firm — IPLA P.A.; James E. Bame

(57) ABSTRACT

A soft box with a smooth rod folding structure, comprising: brackets mounted on the edge of the speed ring at uniform intervals so as to couple the rods; a lever mounted by a first hinge part on the upper end of each of the brackets; a link connected to the lever by a second hinge part, which is provided to the lever so as to be located at the rear end side of the bracket at the same height as the first hinge part when the lever is fully lifted to the upper part of the bracket and moved to the side surface of the bracket when the lever is moved reversely; a rod support provided by a third hinge part at the lower end of the bracket.

3 Claims, 5 Drawing Sheets

SOFT BOX WITH SMOOTH ROD FOLDING STRUCTURE

CROSS REFERENCE

This application claims foreign priority under Paris Convention to Korean Patent Application No. 10-2017-0100393, filed 8 Aug. 2018, with the Korean Intellectual Property Office.

BACKGROUND

The present invention relates to a soft box that is a type of photographic lighting device and, more particularly, to a soft box having a folding structure similar to that of an umbrella rod, in which the folding structure of the soft box is improved such that even a large soft box can be easily folded or unfolded.

As is well known, the strobe is used to realistically express the texture of a subject in a rich light quantity and to reproduce accurate colors when photographing portraits or advertisement photographs indoors. Although the strobe light is directly irradiated to the subject. However, in order to obtain soft lighting, a soft box is combined with the front of the strobe to use reflected light.

There are various types of soft boxes, but usually a soft box includes a speed ring (adapter ring) formed in the center to be coupled to the strobe and a reflecting fabric provided in the shape of an umbrella or a funnel in the vicinity thereof so as to diffuse and reflect light.

In order to maintain the reflecting fabric in the unfolded shape of an umbrella or a funnel, rods made of metal or synthetic resin are coupled, wherein one side end of each of the rods is mounted on a side surface of an adapter ring and the other side end is fixed to the end of the reflecting fabric. In order to maintain a stretched and unfolded state of the reflecting fabric, the rods are coupled to have elasticity while being slightly inclined in the outward direction.

The soft box rods are conventionally configured to be inserted into or withdrawn from a speed ring respectively, but in recent years, a folding structure is used to fold or unfold the rods in the insertion state.

When using these folding soft boxes, there is no particular problem with small-sized soft boxes. However, in the case of a large soft box, especially when it is unfolded, it is considerably difficult to perform a release operation for folding the same and maintain the unfolded state stably.

In order to overcome the need for greater strength in the folding process of such a large soft box and to maintain the unfolded state effectively, the configuration as disclosed in the following document has been proposed.

However, this prior art still has a problem in that a small-sized soft box is easily unfolded or folded but a large-sized soft box also requires too much force for the release operation. In order to solve the problem, a complicated releasing configuration has been provided, leading to various disadvantages such that the price has risen, the weight has become heavy, and repair has become difficult, etc.

SUMMARY OF THE INVENTION

Accordingly, the present invention has been made in view of the above-mentioned problems, and it is an objective of the present invention to provide a soft box, which can be easily unfolded even in the case of a large soft box, perform a releasing operation for folding without a lot of force, and maintain a stable unfolded state in an unfolded state.

To accomplish the above objective, according to a preferred embodiment of the present invention, there is provided a soft box, in which brackets are mounted on the edge of a speed ring at uniform intervals so as to couple rods, a lever is mounted by a first hinge part on the upper end of each of the brackets, and a link is connected to the lever by providing a second hinge part to the lever, wherein the second hinge part is located at the rear end side of the bracket at the same height as the first hinge part when the lever is fully lifted to the upper part of the bracket and moved to the side surface of the bracket when the lever is moved reversely.

In addition, a rod support is provided by a third hinge part formed at the lower end of the bracket such that the rod is inserted thereinto, and has a fourth hinge part so as to be connected to the link such that, when the lever is operated, the force of the lever is transmitted to the rod support through the link and the rod support rotates with respect to the third hinge part.

According to the present invention, the structure for folding or unfolding the rods is greatly simplified as a whole. Therefore, the manufacturing cost can be reduced, the weight can be lightened, and the replacement or repair can be simplified due to the structure exposed to the outside.

Especially, when folding the unfolded rods, the folding operation can be easily carried out with little force even in the case of a large soft box by simple operation of moving the lever while slightly lifting the rods and thus releasing the holding by the folding, thereby enabling convenient use. In addition, in the state, in which the unfolding is completed, the unfolding is not released without intention by the functional characteristics of the link and the hinge positions. Therefore, it is possible to maintain the unfolded state stably.

DETAILED DESCRIPTION OF THE PREFERRED EMBODIMENT

Figure 1:
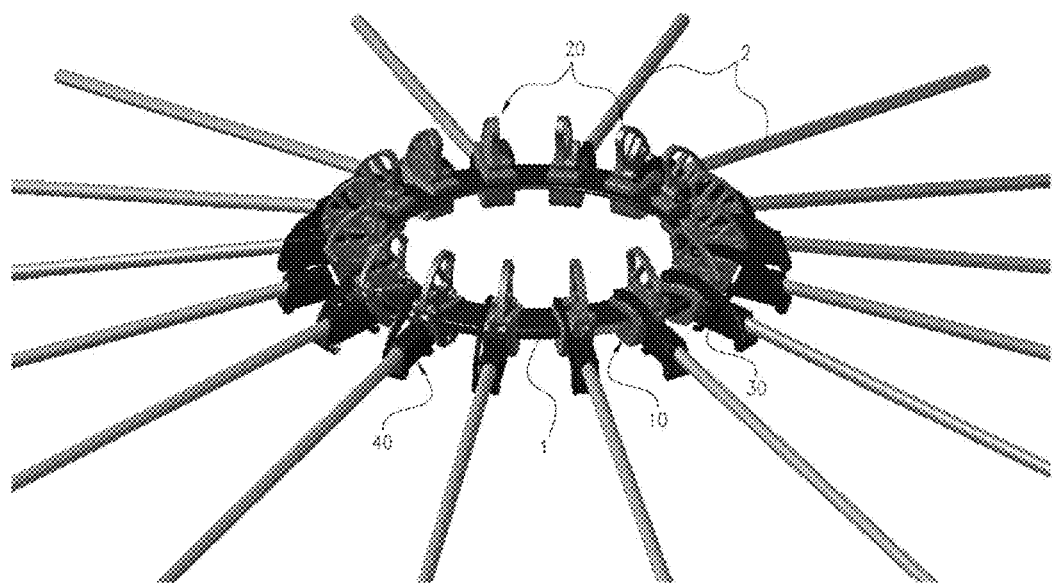
FIG. 1 is a perspective view of the entire assembled state according to the present invention.
Figure 2:
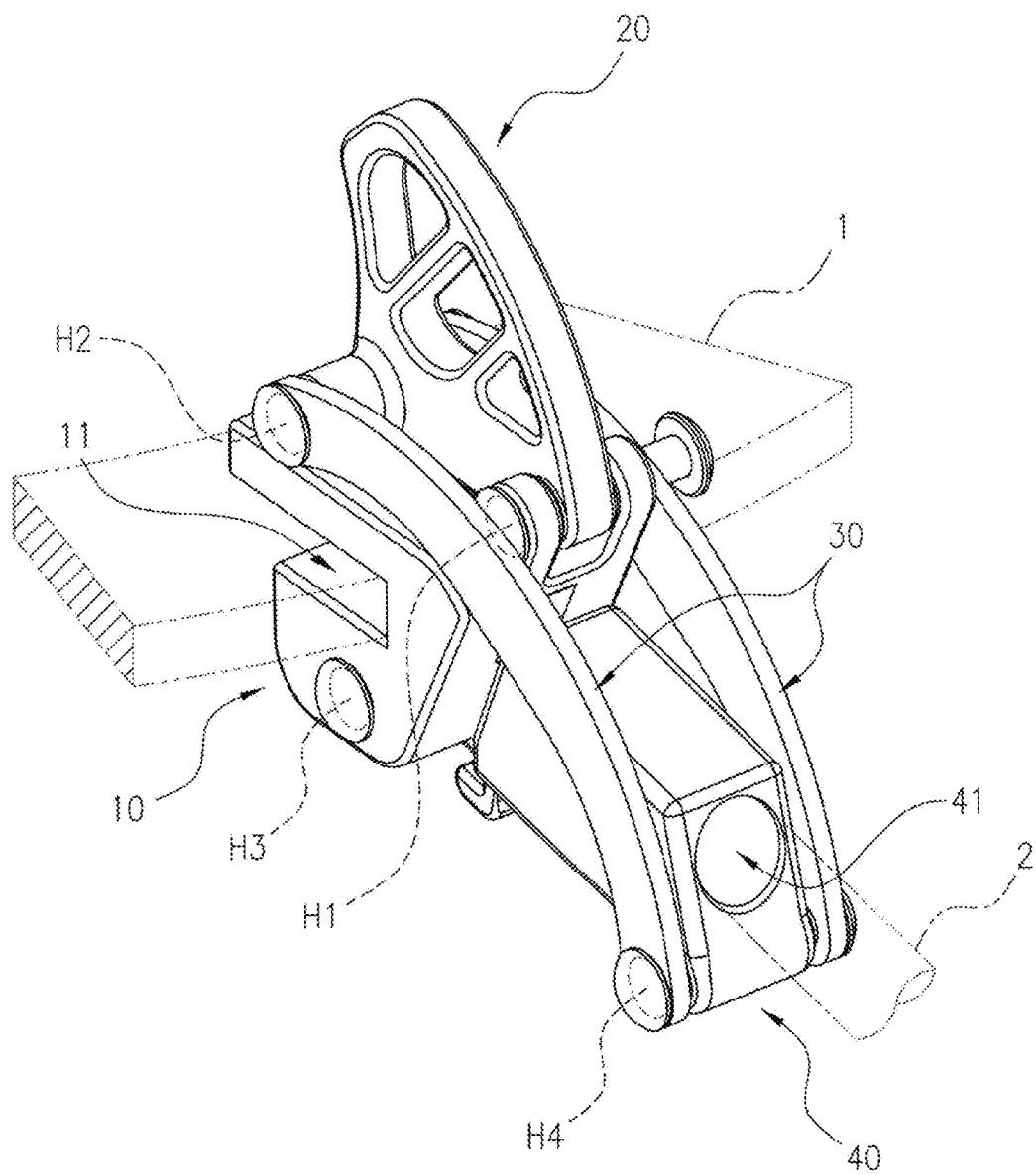
FIG. 2 is a perspective view of the principal parts of the present invention.
Figure 3:
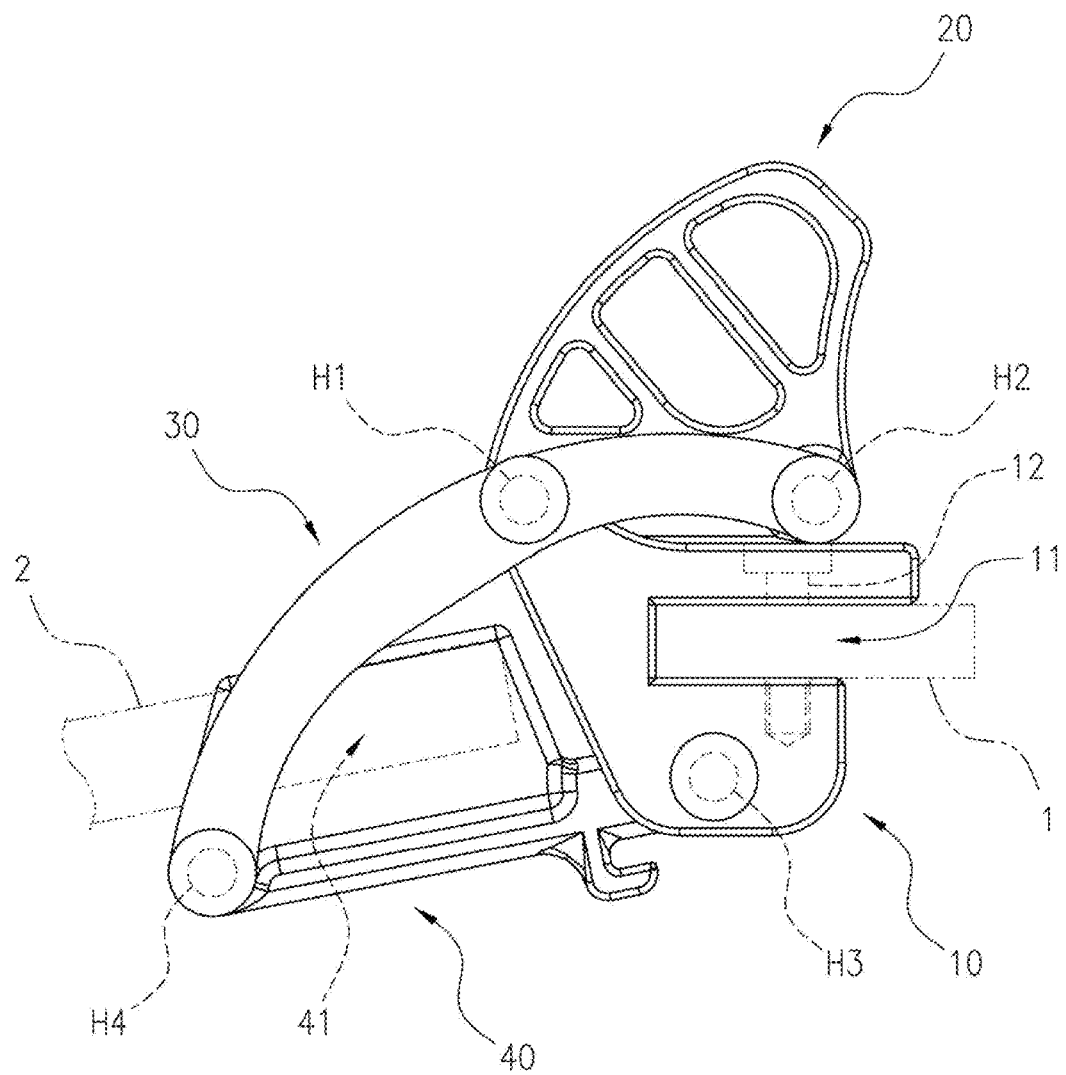
FIG. 3 is a front view of the present invention.

Hereinafter, preferred embodiments of the present invention will be described in detail with reference to the accompanying drawings.

The soft box of the present invention has a plurality of rods 2 provided in a radial shape with respect to a speed ring 1 as well-known, and a strobe mounted in the center.

In the present invention, a plurality of brackets 10 for coupling the rods 2 are mounted at uniform intervals on the edge of the speed ring 1, and each of the brackets 10 has a fixing groove 11 formed on one side thereof so as to accommodate the edge of the speed ring 1 and a coupling hole 12 for coupling a fixing bolt.

A lever 20 is connected to the upper end of each of the brackets 10 and has a first hinge part H1, which is provided at a position protruding outwards from the edge of the speed ring 1 and connected to one side of the lever 20, such that the lever 20 is mounted to be rotatable with respect to the first hinge part H1 in the upper and lower directions of the bracket 10.

The lever 20 has a second hinge part H2, which is located at the rear end side of the bracket 10 more than the first hinge part H1 when the lever 20 is fully lifted to the upper part of the bracket 10 and moves to the side surface of the bracket 10 when the lever 20 is moved reversely. Therefore, a link 30 is connected to the lever 20 by the second hinge part H2.

The bracket 10 has a third hinge part H3 provided at the lower end thereof so as to connect a rod support 40, wherein the rear end of the rod support 40 is connected to the third hinge part H3 and the rod support 40 is coupled so as to carry out rotational motion with respect to the third hinge part H3 from the downward direction of the speed ring 1 to the lateral direction of the speed ring 1. The rod support 40 has a rod hole 41 formed in one side thereof such that the rod 2 is inserted and fixed in the rod hole 41.

The rod support 40 has a fourth hinge part H4 formed at the lower end in the lateral direction of the rod hole 41 so as to connect the link 30. Therefore, if the lever 20 is operated, the force of the lever 20 is transmitted to the rod support 40 through the link 30 such that the rod support 40 rotates with respect to the third hinge part H3.

The link 30 is formed in an arc shape so as to be pulled and lifted with gentle and uniform force when the lever 20 pulls the rod support 40 while rotating with respect to the first hinge part. When the rod 2 is completely unfolded, the second hinge part H2 passes the side surface of the first hinge part H1, forming a shape, in which the second hinge part H2 is connected to the fourth hinge part H4. Therefore, in the state, in which the lever 20 is not tilted, the force of the rod 2 to be tilted, that is, the action of the rod support 40 to be lowered, is prevented. If the rod 2 is completely unfolded, the rod 2 is bent and has elastic force. Therefore, even if such elastic force is applied, the lever 20 will not be tilted by itself.

The operation of the present invention having such a configuration will be described in accordance with the method of use as follows.

Figure 4:
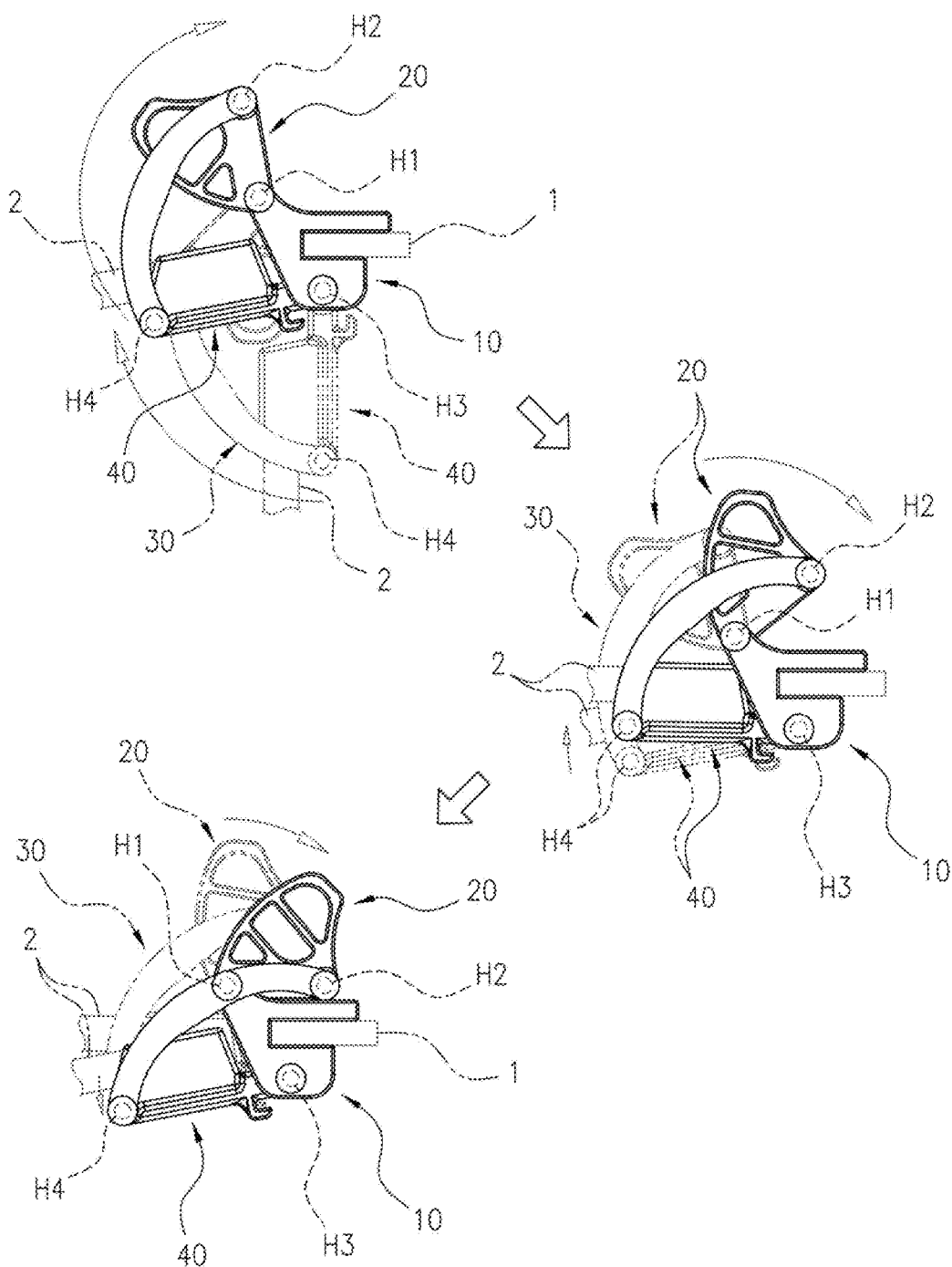
FIG. 4 shows unfolding operation states of the present invention.
Figure 5:
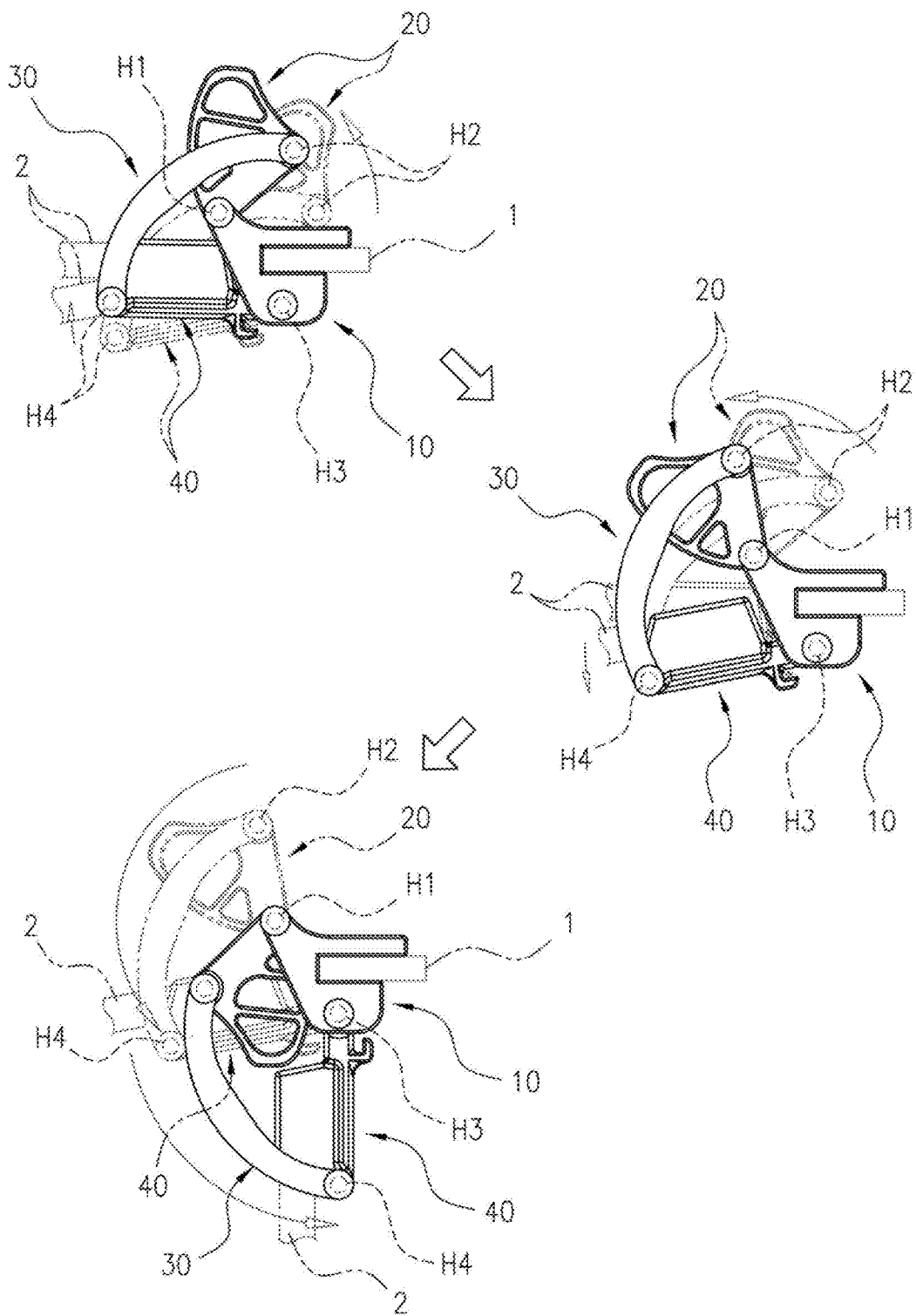
FIG. 5 shows folding operation states of the present invention.

As for the folded state of the rod, the rod 2 and the rod support 40 are tilted in the vertical direction with respect to the speed ring 1, as shown in FIG. 4, and accordingly the lever 20 is also tilted in the forward direction of the bracket 10, wherein the link 30 is maintained between the second hinge part H2 and the fourth hinge part H4.

In the case of unfolding for the use of the soft box, the unfolding is carried out by holding and unfolding the rod 2, wherein the link 30 pushes and lifts the lever 20 while the rod support 40 is tilted and lifted up with respect to the third hinge part H3 by tilting and lifting the rod 2 up to the upper portion, then the lever 20 is tilted about 180 degrees with respect to the first hinge part H1, the second hinge part H2 comes into contact with the upper surface of the bracket 10, and thus the unfolding is completed.

In this process, the rod 2 is lifted slightly more than the final unfolded state and then lowered, completing the unfolding. When the unfolding is completed, the unfolding is not released by the force of the rod 2 being turned downwards itself because the unfolding of the rod 2 is completed at the position where the rod 2 is lowered again after the position where the fourth hinge part H4 at a final height, the first hinge part H1 and the second hinge part H2 are in a straight line, while the link 30 is moved by the lever 20, which rotates with respect to the first hinge part H1. In this state, if the rod 2 is applied with lowering and folding force due to own elasticity, then the lever 20 is held by the bracket 10. Therefore, the rod 2 cannot be folded and is maintained in the unfolded state.

In order to release the unfolding and carry out folding in this state, the lever 20 has to be operated. If the lever is moved to the front portion of the bracket 10 with respect to the first hinge part H1, the rod support 40 is slightly lifted by the link 30 and then lowered again. At this time, if the lever 20 is moved while the rod 2 is slightly lifted up by hands, then the rod 2 can be folded with little force.

What is claimed is:

1. In a soft box with a plurality of rods (2) arranged radially with respect to a speed ring (1) and a strobe mounted in the center, a soft box with a smooth rod folding structure, comprising:

brackets (10) mounted on the edge of the speed ring (1) at uniform intervals so as to couple the rods (2);

a lever (20) mounted by a first hinge part on the upper end of each of the brackets (10);

a link (30) connected to the lever (20) by a second hinge part(H2), which is provided to the lever (20) so as to be located at the rear end side of the bracket (10) at the same height as the first hinge part (H1) when the lever (20) is fully lifted to the upper part of the bracket (10) and moved to the side surface of the bracket (10) when the lever (20) is moved reversely;

a rod support (40) provided by a third hinge part (H3) at the lower end of the bracket (10) such that the rod (2) is inserted thereinto and having a fourth hinge part (H4) so as to be connected to the link (30) such that, when the lever (20) is operated, the force of the lever (20) is transmitted to the rod support (40) through the link (30) and the rod support (40) rotates with respect to the third hinge part (H3).

2. The soft box with a smooth rod folding structure according to claim 1, wherein the lever (20) has the first hinge part (H1), which is provided at a position protruding outwards from the edge of the speed ring (1) and connected to one side of the lever (20) such that the lever (20) is provided to be rotatable with respect to the first hinge part (H1) in the upper and lower directions of the bracket (10), and the second hinge part, which is formed at the rear end of the lever to connect the link.

3. The soft box with a smooth rod folding structure according to claim 1, wherein the unfolding of the rod (2) is completed at the position where the rod (2) is lowered again after a position where the fourth hinge part (H4) at a final height, the first hinge part (H1) and the second hinge part (H2) are in a straight line, while the link (30) is moved by the lever (20), which rotates with respect to the first hinge part (H1).

* * * * *